US011886878B2

(12) United States Patent
Shenoy et al.

(10) Patent No.: US 11,886,878 B2
(45) Date of Patent: Jan. 30, 2024

(54) DISTRIBUTING POWER SHARED BETWEEN AN ACCELERATED PROCESSING UNIT AND A DISCRETE GRAPHICS PROCESSING UNIT

(71) Applicants: ADVANCED MICRO DEVICES, INC., Santa Clara, CA (US); ATI TECHNOLOGIES ULC, Markham (CA)

(72) Inventors: Sukesh Shenoy, Austin, TX (US); Adam N. C. Clark, Markham (CA); Indrani Paul, Austin, TX (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 285 days.

(21) Appl. No.: 16/712,891

(22) Filed: Dec. 12, 2019

(65) Prior Publication Data

US 2021/0182066 A1 Jun. 17, 2021

(51) Int. Cl.
*G06F 1/00* (2006.01)
*G06F 9/30* (2018.01)
(Continued)

(52) U.S. Cl.
CPC ........ *G06F 9/30083* (2013.01); *G06F 1/3203* (2013.01); *G06F 9/3877* (2013.01); *G06F 9/4843* (2013.01); *G06F 2009/3883* (2013.01)

(58) Field of Classification Search
CPC .. G06F 9/30083; G06F 1/3203; G06F 9/3877; G06F 9/4843; G06F 2009/3883; G06F 1/203; G06F 1/206; G06F 1/324; G06F 1/3296; G06F 9/5094; G06F 1/3206; Y02D 10/00

See application file for complete search history.

(56) References Cited

U.S. PATENT DOCUMENTS 9,274,574 B2 * 3/2016 Conroy ................. G05D 23/19
2011/0169840 A1 7/2011 Bakalash
(Continued)

OTHER PUBLICATIONS

International Search Report and Written Opinion dated Apr. 9, 2021 for PCT/US2020/064481, 9 pages.
(Continued)

*Primary Examiner* — Xuxing Chen

(57) ABSTRACT

An integrated coprocessor such as an accelerated processing unit (APU) generates commands for execution on a discrete coprocessor such as a discrete graphics processing unit (dGPU). Power distribution circuitry selectively provides power to the APU and the dGPU based on characteristics of workloads executing on the APU and the dGPU and based on a platform power limit that is shared by the APU and the dGPU. In some cases, the power distribution circuitry determines a first power provided to the APU and a second power provided to the dGPU. The power distribution circuitry increases the second power provided to the dGPU in response to a sum of the first and second powers being less than the platform power limit. In some cases, the power distribution circuitry modifies the power provided to the APU, the dGPU, or both in response to changes in temperatures measured by a set of sensors.

21 Claims, 5 Drawing Sheets

(51) Int. Cl.
    *G06F 9/48*       (2006.01)
    *G06F 1/3203*    (2019.01)
    *G06F 9/38*       (2018.01)

(56) References Cited

U.S. PATENT DOCUMENTS

| | | |
|---|---|---|
| 2012/0324248 A1 | 12/2012 | Schluessler et al. |
| 2013/0031064 A1 | 1/2013 | Vo |
| 2013/0246820 A1 | 9/2013 | Branover et al. |
| 2014/0068284 A1 | 3/2014 | Bhandaru et al. |
| 2014/0089699 A1 | 3/2014 | O'Connor et al. |
| 2015/0006937 A1* | 1/2015 | Rotem ............... G06F 1/3215 |
| | | 713/324 |
| 2016/0266629 A1 | 9/2016 | Merrikh et al. |
| 2018/0088606 A1 | 3/2018 | Huang et al. |
| 2019/0377395 A1* | 12/2019 | Kaburlasos ........ G06F 1/3206 |
| 2021/0125551 A1* | 4/2021 | Siddiqui ............ G06F 1/3212 |
| 2021/0157383 A1* | 5/2021 | Hsu .................... G06F 1/3228 |

OTHER PUBLICATIONS

International Preliminary Report on Patentability dated Jun. 23, 2022 for PCT/US2020/064481, 6 pages.

Extended European Search Report issued in Application No. 20898484.9, dated Dec. 4, 2023.

\* cited by examiner

DISTRIBUTING POWER SHARED BETWEEN AN ACCELERATED PROCESSING UNIT AND A DISCRETE GRAPHICS PROCESSING UNIT

BACKGROUND

High-performance computing devices such as laptop computers, tablet computers, mobile phones, and smart watches include heterogeneous processing units such as an accelerated processing unit (APU) that include multiple types of coprocessors. For example, an APU typically includes one or more central processing unit (CPU) cores and one or more graphics processing unit (GPU) cores, which are sometimes referred to as integrated GPUs (iGPUs). Additional graphics processing capability, and in some cases general purpose computing capability, is provided by including a discrete graphics processing unit (dGPU) in the computing device. The power dissipated in the APU and dGPU tends to raise the temperature of the computing device. The APU and the dGPU are therefore connected to heat dissipation systems such as heat pipes that move heat away from the APU and dGPU towards corresponding heatsinks that dissipate thermal energy into the environment. The cooling requirements of the system are determined, at least in part, by the structure of the computing device and the thermal energy dissipated by the APU and the dGPU. The heat dissipation systems of the APU and the dGPU maintain the temperatures of the APU and the dGPU below levels that result in damage to the components or reduce their service lifetimes.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
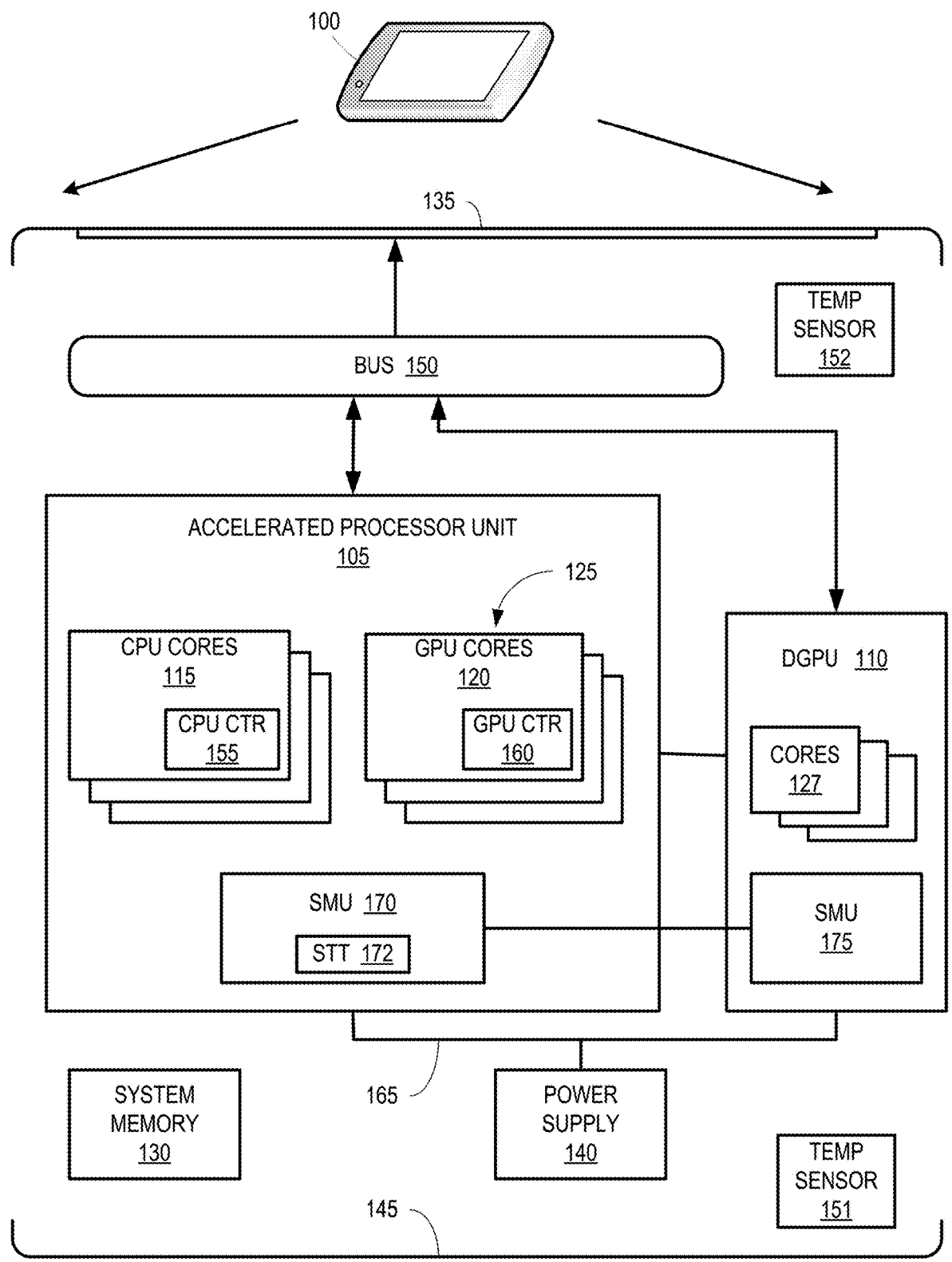
FIG. 1 is a block diagram of a device including an integrated processing unit and a separate, discrete coprocessor according to some embodiments.

A system management unit (SMU) implements power management techniques to allocate power to an integrated coprocessor core (such as central processing unit (CPU) cores in an accelerated processing unit (APU)) and a discrete coprocessor core (such as a discrete graphics processing unit (dGPU)) based on corresponding fixed processor power and thermal envelopes. For example, the SMU allocates power to the CPU cores in an APU based on a thermal design point (TDP) that is set based on running a heavy workload on the APU under worst-case conditions. The TDP represents an upper bound for sustainable power and is used to determine system cooling requirements. For another example, the SMU allocates power to a dGPU based on a total graphics power (TGP) that represents the maximum amount of graphics board power that the system power supply provides to the dGPU. In some cases, the maximum operating temperature of a device is limited more by the perception of the user than by the silicon temperature limit. Heat generated by the processing units in a handheld device is conducted to the outer surfaces of the device, such as the display and the casing, where the user interfaces with the device during its operation. To provide the user with a comfortable experience, the maximum power budgets allotted to the APU and the dGPU are set at corresponding fixed limits that could be less than the TDP or TGP, respectively, to maintain the skin temperature of the device below a value that the user would perceive as being uncomfortably hot.

In the case of ultra-thin platforms that are used to implement handheld or wearable computing devices, the thermal capacity of the chassis and thermal solution cannot support providing the full TDP to the APU concurrently with providing the full TGP to the dGPU and associated video memory. Operating the APU at the full TDP concurrently with operating the dGPU at the full TGP would heat the ultra-thin platform to a temperature that could damage the device or at least cause the user discomfort. The power supplied to the APU is therefore artificially and statically limited to a lower level that allows the dGPU to operate at the TGP concurrently with the APU operating at its (reduced) maximum power level. Moreover, the power supplied to the dGPU is not increased in response to the APU operating below its maximum power level, nor is the power supply to the APU increased in response to the dGPU operating below the TGP. In the case of high-performance platforms, the thermal capacity of the chassis and thermal solution support providing the full TDP to the APU concurrently with providing the full TGP to the dGPU and associated video memory. However, there is limited opportunity for performance gains under either core intensive workloads that predominantly utilize the APU or graphics intensive workloads that predominantly utilize the dGPU.

FIGS. 1-5 disclose embodiments of a computing device that distributes power to one or more integrated coprocessor cores and one or more discrete coprocessor cores based on characteristics of workloads executing on the integrated and discrete coprocessor cores and a platform power limit that is shared by the integrated and discrete coprocessor cores. In some embodiments, power distribution circuitry manages power consumption of an APU that implements the integrated coprocessor cores and a dGPU that implements the discrete coprocessor cores based on the available platform power (e.g., supplied by an AC power source or a battery) and thermal constraints. For example, the power distribution circuitry selectively distributes power away from the APU and towards the dGPU for graphics intensive workloads. The amount of power supplied to the dGPU is determined based on the available platform power and thermal constraints such as a maximum skin temperature of the computing device. The skin temperature is determined based on pre-calibrated parameters that determine a relationship between temperatures that are measured using one or more temperature sensors and the skin temperature of the computing device. The power distribution circuitry also dynamically modifies the power supplied to the integrated and discrete coprocessor cores in response to changes in the characteristic of the workloads executing on the integrated and discrete coprocessor cores and changes in the skin temperatures. For example, the power distribution circuitry shifts power from a dGPU to an APU in response to a workload shifting from being graphics intensive to being core intensive. For another example, the power distribution circuitry reduces the power supplied to the dGPU for a graphics intensive workload in response to a measured temperature rising above a threshold. Some embodiments of the power distribution circuitry distribute power to the APU based upon a maximum power dissipation (Qmax) for a heat pipe associated with the APU.

FIG. 1 is a block diagram of a device 100 including an integrated processing unit 105 and a separate, discrete coprocessor 110 according to some embodiments. In the illustrated embodiment, the integrated processing unit 105 is implemented as an accelerated processing unit (APU) 105 and the separate, discrete coprocessor 110 is implemented as a graphics processing unit (dGPU) 110. However, the integrated processing unit 105 or the discrete coprocessor 110 are implemented using other types of coprocessors, digital signal processors, application-specific integrated circuits (ASICs), field programmable gate arrays (FPGAs), and the like in other embodiments. Some embodiments of the device 100 are embodied in a handheld or wearable device, such as a laptop computer, a handheld computer, a tablet computer, a mobile device, a telephone, a personal data assistant ("PDA"), a music player, a game device, and the like.

The APU 105 includes integrated coprocessor cores such as one or more central processing unit (CPU) cores 115 and one or more graphics processing unit (GPU) cores 120, which are collectively referred to herein as an integrated GPU (iGPU) 125. The one or more CPU cores 115 and the one or more iGPUs 125 are disposed on the same integrated circuit (IC) die or on different IC dies in the same IC package. The CPU cores 115 have independently controlled power planes that allow voltages and frequencies to be controlled independently from those associated with the GPU cores 120. Some embodiments of the dGPU 110 include one or more discrete coprocessor cores 127. The dGPU 110 also has an independently controlled power plane that allows the voltages and frequencies that are provided to the dGPU 110 (or the discrete coprocessor cores 127) to be controlled independently from those associated with the APU 105, the CPU cores 115, or the GPU cores 120.

The device 100 includes system memory 130, a display 135, and a power supply 140 (including voltage regulator, a battery and a battery charging unit—not separately shown in the interest of clarity). Although not shown in FIG. 1 in the interest of clarity, a northbridge controller in the APU 105 provides an interface to the system memory 130. The operation of the device 100 is generally controlled by an operating system including software that interfaces with the various elements of the device 100. The APU 105 integrates the CPU cores 115 and GPU cores 120 on a common semiconductor die, allowing them to share on-die resources such as the memory hierarchy and interconnect.

The device 100 includes an outer casing 145 that supports the display 135 and surrounds the active components of the device 100. The outer casing 145 also provides outer surfaces along which a user interfaces with the device 100. The APU 105 controls the display 135 and receives user input from the display 135 for embodiments where the display 135 is a touch screen. The dGPU 110 or the iGPU 125 provides signals to the display 135 via a bus 150 such as a peripheral component interconnect (PCI, PCI-E) bus. The signals include information representative of colors and intensities generated by pixels in the display 135, which combine to produce an image seen by a user that is observing the display 135. If the display 135 is a touch screen, the bus 150 is also used to convey signals from the display 135 to the APU 105, which uses the signals to initiate operations based on the location of touch points (and, in some cases, the amount or duration of pressure applied by the user) on the display 135.

One or more temperature sensors 151, 152 are provided in the device 100, such as a sensor 151 proximate the casing 145 and a sensor 152 proximate the display 135. A skin temperature, which indicates a temperature perceived by a user holding the device, is estimated based on the temperatures measured by the temperature sensors 151, 152. In some embodiments, a relationship between the measured temperatures and the skin temperature is pre-calibrated by comparing actual measured skin temperatures to measured values. For example, parameters of a model that relates the skin temperature to the measured temperatures are determined using a calibration process that directly measures the temperature of portions of the outer casing 145 and correlates these measurements with temperatures measured by the sensors 151, 152. Activity counters, such as a CPU counter 155, a GPU counter 160, and other counters such as a memory counter (not shown in FIG. 1 in the interest of clarity) are provided in some embodiments of the device 100 to generate device activity metrics for the components to estimate the heat they generate and how it contributes to skin temperature.

Power is distributed from the power supply 140 to the APU 105 and the dGPU 110 via power distribution circuitry 165. In the illustrated embodiment, the APU 105 includes an SMU 170 and the dGPU 110 includes an SMU 175, which monitors power consumption characteristics in the dGPU 110 such as a current power supplied to, or dissipated in, the dGPU 110. The SMU 175 provides information indicating the power consumption characteristics to the APU 105. The power consumption information is provided periodically, at predetermined time intervals, in response to power-related events in the dGPU 110, or at other times. Based on the received power consumption information, the SMU 170 determines and dynamically adjusts the power supplied to the APU 105 and the dGPU 110 by the power supply 140 based on characteristics of workloads executing on the APU 105 and the dGPU 110. Distribution of power to the APU 105 and the dGPU 110 is also based on a platform power limit that is shared by the APU 105 and the dGPU 110. In some embodiments, the platform power limit is equal to (or is determined based on) a sum of a thermal design point (TDP) that is set based on running a heavy workload on the APU 105 under worst-case conditions and a total graphics power (TGP) that represents the maximum amount of graphics board power that the system power supply provides to the dGPU 110. The TDP represents an upper bound for sustainable power that is provided to the APU 105 and is used to determine system cooling requirements. In some embodiments, the power supplied to the dGPU 110 exceeds the TGP without causing any damage to the dGPU 110 or other circuitry within the device 100.

The SMU 170 modifies the power distributed to the APU 105 and the dGPU 110 in response to changes in characteristics of the workloads executing on the APU 105 or the dGPU 110. Some embodiments of the SMU 170 shift power from the APU 105 to the dGPU 110 in response to the workload shifting from being a core intensive workload that predominantly consumes resources of the APU 105 to a graphics intensive workload that predominantly consumes resources of the dGPU 110. The SMU 170 also shifts power from the dGPU 110 to the APU 105 in response to the workload shifting from being a graphics intensive workload that predominantly consumes resources of the dGPU 110 to a core intensive workload that predominantly consumes resources of the APU 105.

Some embodiments of the SMU 170 implement skin temperature tracking (STT). For example, the SMU 170 can implement a STT controller 172 that sets a dynamic power limit for the device 100 based on a determined skin temperature. The SMU 170 uses information provided by the STT controller 172 to dynamically determine a power distribution between the APU 105 and the dGPU 110 in conjunction with the constraints imposed by the platform power limit and the characteristics of the workloads executing on the APU 105 and the dGPU 110. Within the power distributed to the APU 105, the STT controller in the SMU 170 implements dynamic voltage and frequency scaling (DVFS) to adapt voltage and clock levels of the CPU cores 115 and the GPU cores 120. Some embodiments of the SMU 170 also control the bandwidth allotted to the system memory 130 or the battery charging rate employed by the power supply 140 to control their respective heat contributions.

The skin temperature of the device 100 is estimated using pre-calibrated correlations between temperatures measured by the temperature sensors 151, 152 and measured values of the skin temperature. The pre-calibrated correlations are used to set values of parameters that relate the temperatures measured by the temperature sensors 151, 152 to skin temperatures perceived by a user using the device 100. The SMU 170 modifies the power distributed to the APU 105 or the dGPU 110 based on the estimated skin temperature. For example, if the SMU 170 determines that a sum of a first power supplied to the APU 105 and a second power supplied to the dGPU 110 is less than the platform power limit, the SMU 170 increases the power supplied to the dGPU 110. In addition, the SMU 170 (or the STT controller 172) determines or modifies the power provided to the dGPU 110 by an amount that is determined based on a comparison of the skin temperature to a maximum skin temperature set by a thermal constraint for the device 100 or the dGPU 110. For example, the SMU 170 decreases the power provided to the dGPU 110 in response to the skin temperature exceeding the maximum skin temperature. For another example, the SMU 170 increases the power provided to the dGPU 110 (and, in some cases, the APU 105) in response to the skin temperature being below the maximum skin temperature.

Figure 2:
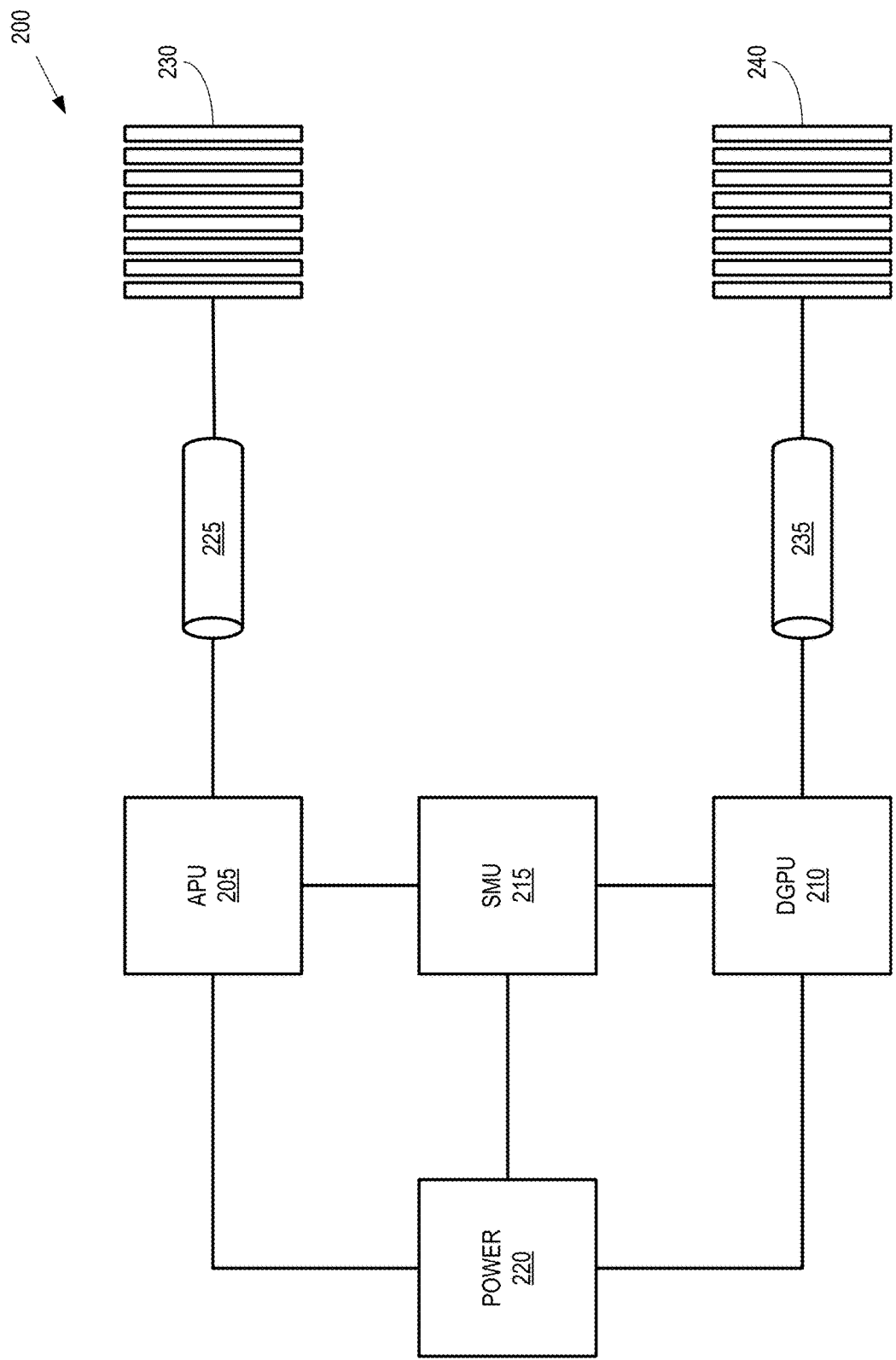
FIG. 2 is a block diagram of a processing system that includes heat dissipation mechanisms for an integrated coprocessor and a discrete coprocessor according to some embodiments.

FIG. 2 is a block diagram of a processing system 200 that includes heat dissipation mechanisms for an integrated coprocessor 205 and a discrete coprocessor 210 according to some embodiments. In the illustrated embodiment, the integrated coprocessor 205 is implemented as an APU 205 and the discrete coprocessor 210 is implemented as a dGPU 210. The processing system 200 is used to implement some embodiments of the device 100 shown in FIG. 1. The processing system 200 includes a system management unit (SMU) 215 that distributes power from a power supply 220 to the APU 205 and the dGPU 210. Some embodiments of the power supply 220 include (or connected to) power distribution circuitry to communicate between APU 205 and dGPU 210 to exchange workload activity demands and power limit information with the SMU 215. For example, the GPU 205, the dGPU 210, and the SMU 215 can communicate via a PCIe bus, using a serial bus two-wire (I2C) protocol, a one-wire protocol, and the like.

In the illustrated embodiment, the APU 205 is connected to a heat pipe 225 that channels heat from the APU 205 to a corresponding heatsink 230. The dGPU 210 is connected to a heat pipe 235 that channels heat from the dGPU 210 to a corresponding heatsink 240, which is the same or different than the heatsink 230 depending on the implementation. Some embodiments of the SMU 215 distribute power to the APU 205 based upon a maximum power dissipation (Qmax) for the heat pipe 225 and to the dGPU 210 based upon Qmax for the heat pipe 235.

Figure 3:
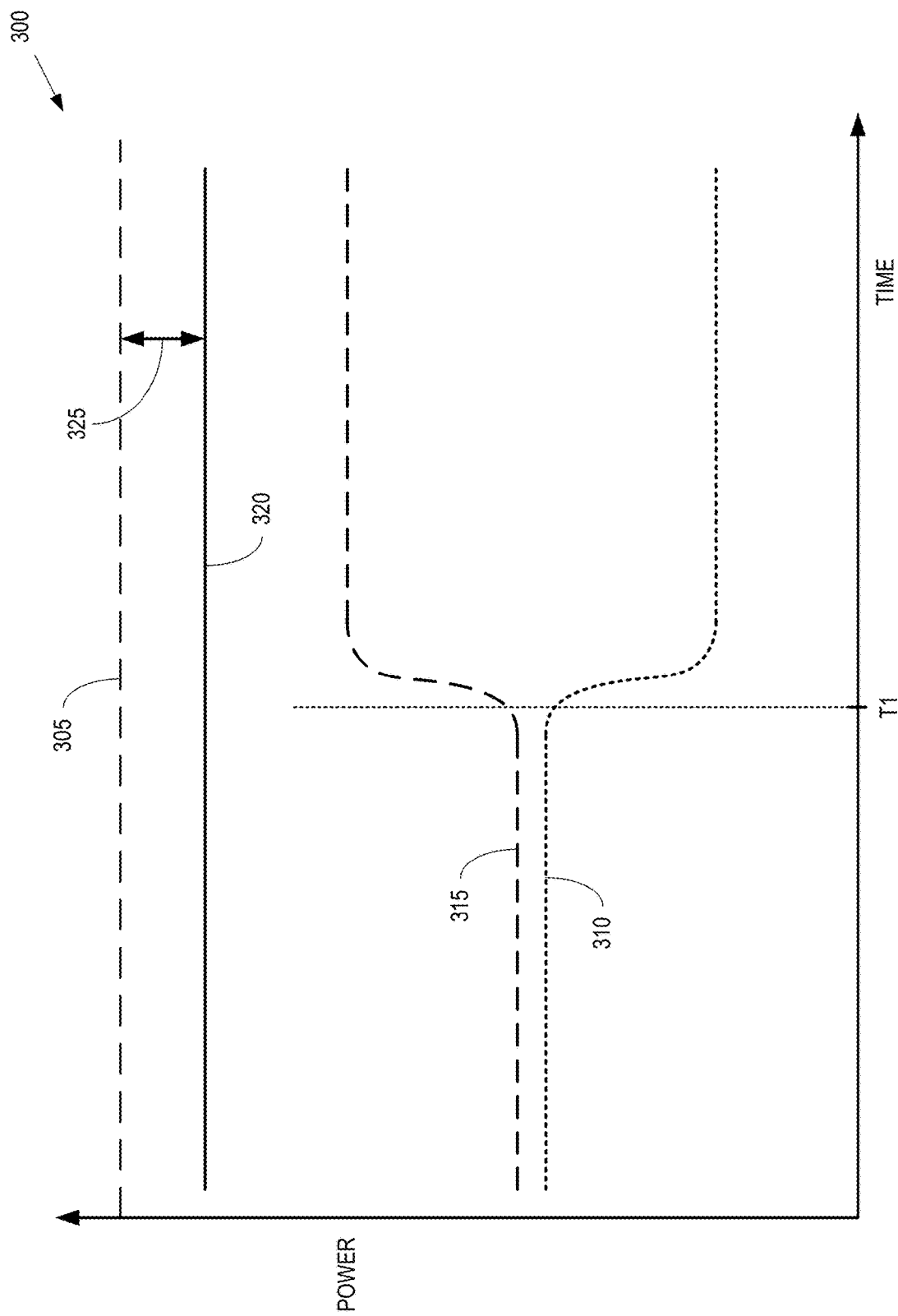
FIG. 3 is a plot that illustrates dynamic shifting of shared platform power from an integrated coprocessor to a discrete coprocessor according to some embodiments.

FIG. 3 is a plot 300 that illustrates dynamic shifting of shared platform power from an integrated coprocessor to a discrete coprocessor according to some embodiments. The plot 300 illustrates the dynamic distribution of power performed by power distribution circuitry such as some embodiments of the SMU 170 shown in FIG. 1 and the SMU 215 shown in FIG. 2. The power distribution circuitry distributes power based on characteristics of the workloads executing on the APU and the dGPU and a platform power limit 305 that indicates a total power available for distribution by the power distribution circuitry.

Prior to the time T1, the power distribution circuitry provides a first power 310 to the APU and a second power 315 to the dGPU. In the illustrated embodiment, the device that includes the APU and the dGPU is executing a workload that is approximately evenly divided between a core workload executed on the APU and a graphics workload executed on the dGPU. Thus, the first power 310 and the second power 315 are approximately equal in the time interval prior to the time T1, although the first power 310 is slightly lower than the second power 315 in the illustrated embodiment. The sum of the first power 310 and the second power 315 is determined based on the platform power limit 305.

The power distribution circuitry also considers thermal constraints such as a maximum skin temperature to determine the power supplied to the APU and the dGPU. In the illustrated embodiment, the thermal constraint results in less than the total power available under the platform power limit 305 being distributed to the APU and the dGPU. For example, a sum of the power supplied to the APU and the dGPU is equal to a reduced platform power limit 320 that is lower than the platform power limit 305 by an amount 325 determined by the thermal constraint.

The power distribution circuitry shifts power from the APU to the dGPU beginning at the time T1. In the illustrated embodiment, the power distribution circuitry shifts the power in response to the workload shifting from core intensive to graphics intensive. For example, the power distribution circuitry decreases the first power 310 by a first amount and increases the second power 315 by a corresponding amount. Although the decrease in the first power 310 is equal to the increase in the second power 315 in the illustrated embodiment, the ratio of the decrease in the first power 310 to the increase in the second power 315 is not always 1:1 and the ratio has different values depending on power consumption characteristics of the APU and the dGPU. Shifting the power from the APU to the dGPU improves performance for the graphics intensive workload while still keeping the total distributed power below the platform power limit 305 and below the reduced platform power limit 320.

Figure 4:
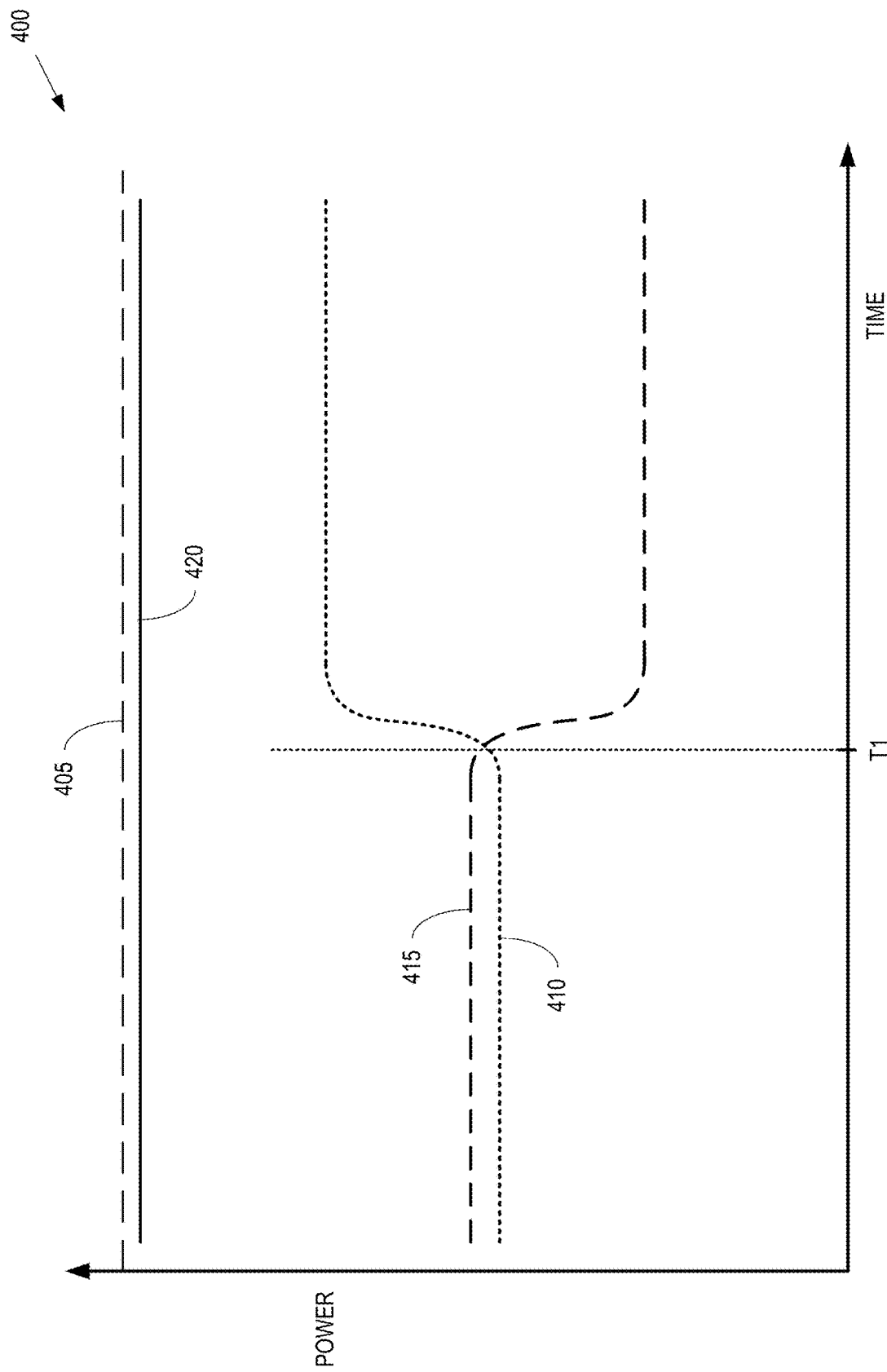
FIG. 4 is a plot that illustrates dynamic shifting of shared platform power from a discrete coprocessor to an integrated coprocessor according to some embodiments.

FIG. 4 is a plot 400 that illustrates dynamic shifting of shared platform power from a discrete coprocessor to an integrated coprocessor according to some embodiments. The plot 400 illustrates the dynamic distribution of power performed by power distribution circuitry such as some embodiments of the SMU 170 shown in FIG. 1 and the SMU 215 shown in FIG. 2. The power distribution circuitry distributes power based on characteristics of the workloads executing on the APU and the dGPU and a platform power limit 405 that indicates a total power available for distribution by the power distribution circuitry. Although the power distribution circuitry considers thermal constraints such as a maximum skin temperature to determine the power supplied to the APU and the dGPU, in the illustrated embodiment, the thermal constraints do not provide a large constraint on the available power and the reduced platform power limit 420 is approximately equal to the platform power limit 405.

Prior to the time T1, the power distribution circuitry provides a first power 410 to the APU and a second power 415 to the dGPU. In the illustrated embodiment, the device that includes the APU and the dGPU is executing a workload that is approximately evenly divided between a core workload executed on the APU and a graphics workload executed on the dGPU. Thus, the first power 410 and the second power 415 are approximately equal in the time interval prior to the time T1, although the first power 410 is slightly lower than the second power 415 in the illustrated embodiment. The sum of the first power 410 and the second power 415 is determined based on the platform power limit 405.

The power distribution circuitry shifts power from the dGPU to the APU beginning at the time T1. In the illustrated embodiment, the power distribution circuitry shifts the power in response to the workload shifting from graphics intensive to core intensive. For example, the power distribution circuitry increases the first power 410 by a first amount and decreases the second power 415 by a corresponding amount. Although the increase in the first power 410 is equal to the decrease in the second power 415 in the illustrated embodiment, the ratio of the increase in the first power 410 to the decrease in the second power 415 is not always 1:1 and the ratio has different values depending on power consumption characteristics of the APU and the dGPU. In some embodiments, the increase in the first power 410 (or the total value of the first power 410) is limited to a value that is below the TDP for the APU. Shifting the power from the dGPU to the APU therefore improves performance for the core intensive workload while still keeping the total distributed power below the platform power limit 405 and below the reduced platform power limit 420.

Figure 5:
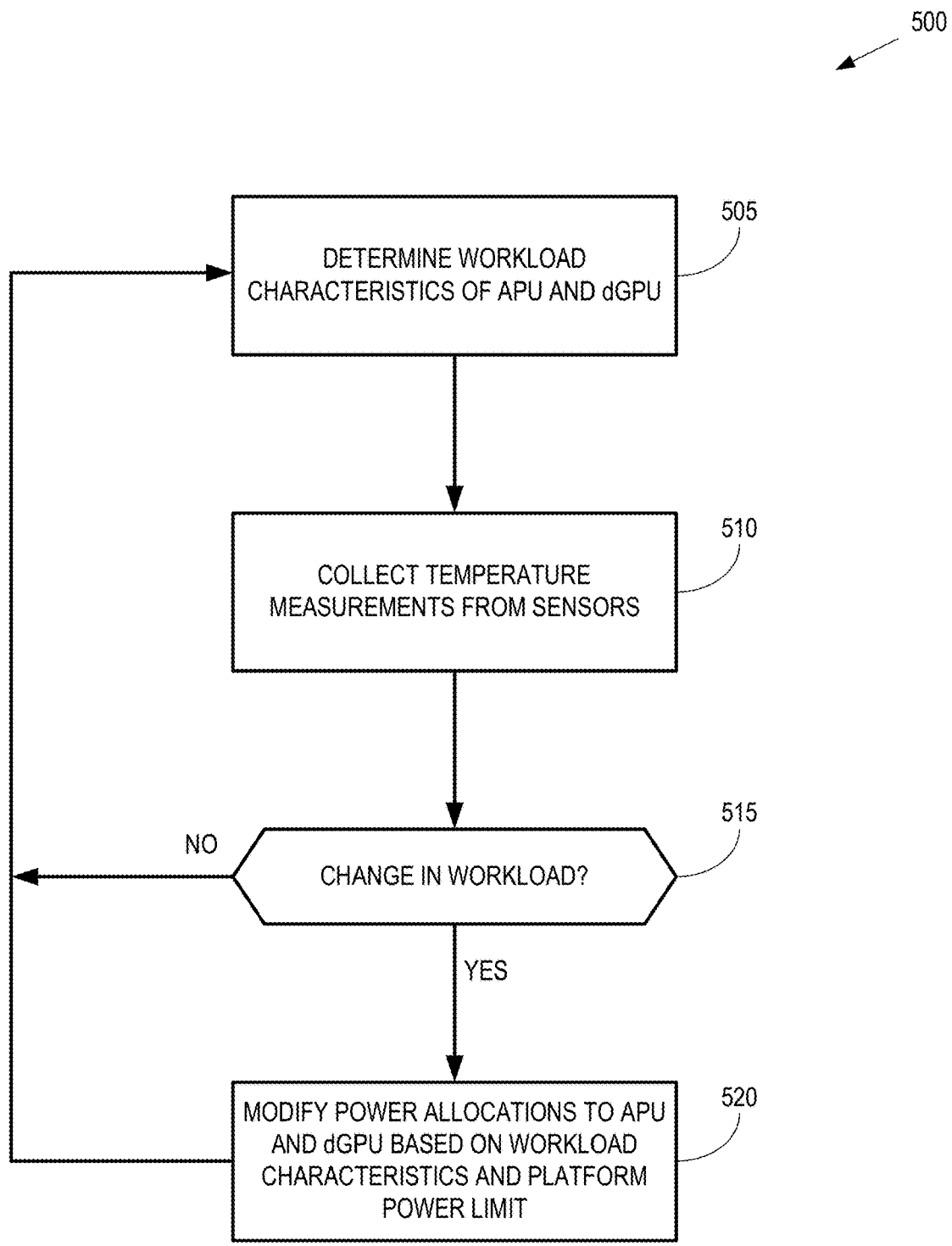
FIG. 5 is a flow diagram of a method of modifying power allocations to an integrated coprocessor and a discrete coprocessor based on characteristics of the workload and a platform power limit according to some embodiments.

FIG. 5 is a flow diagram of a method 500 of modifying power allocations to an integrated coprocessor and a discrete coprocessor based on characteristics of the workload and a platform power limit according to some embodiments. The method 500 is implemented in some embodiments of the SMU 170 in the device 100 shown in FIG. 1 and the SMU 215 in the processing system 200 shown in FIG. 2. As discussed herein, the platform power limit is shared between the APU and dGPU and the SMU is free to distribute the shared power among the APU and the dGPU.

At block 505, the SMU determines characteristics of the workload. In some embodiments, the characteristics include indications of the relative core intensity and graphics intensity of the workload. A workload that performs numerous computations but does not generate imagery for display is considered more core intensive and a workload that performs fewer computations but generates high resolution imagery for display is considered more graphics intensive.

At block 510, the SMU collects temperature measurements from one or more sensors distributed throughout the device. In some embodiments, the temperature values that are measured by the sensors are used to infer thermal conditions (such as a skin temperature) that are compared to corresponding thermal constraints (such as a maximum skin temperature). As discussed herein, the thermal conditions are inferred using a relationship defined by parameters that are determined using a calibration process performed during configuration of the device.

At decision block 515, the SMU determines whether a change in the workload of the APU or the dGPU has occurred. Examples of changes in the workload include, but are not limited to, a shift from a core intensive workload to a graphics intensive workload, a shift from a graphics intensive workload to a core intensive workload, an increase or decrease in the workload allocated to the APU or the dGPU, and the like. If no change in the workload is detected, the method 500 flows back to block 505. If a change in the workload is detected, the method 500 flows to block 520.

At block 520, the SMU modifies the power allocated to the APU and the dGPU based on the modified workload characteristics and the platform power limit. The allocated power is shifted from the APU to the dGPU in response to the workload shifting from core intensive to graphics intensive. The allocated power is shifted from the dGPU to the APU in response to the workload shifting from graphics intensive to core intensive. In some embodiments, the modification in the power allocation is determined, at least in part, by thermal constraints such as a maximum skin temperature. For example, the skin temperature of the device is estimated based on temperature sensor measurements and then compared to the maximum skin temperature. The power allocation is determined to maintain the skin temperature below the maximum skin temperature, e.g., by increasing or decreasing the power allocation based on the comparison of the skin temperature and the maximum skin temperature.

In some embodiments, an apparatus is provided. The apparatus includes an integrated coprocessor comprising at least one central processing unit (CPU) core and at least one graphics processing unit (GPU) core. The integrated coprocessor is configured to generate commands for execution on a discrete coprocessor external to the integrated coprocessor. The apparatus also includes power distribution circuitry configured to selectively provide power to the integrated coprocessor and the discrete coprocessor based on characteristics of workloads executing on the integrated coprocessor and the discrete coprocessor and based on a platform power limit that is shared by the integrated coprocessor and the discrete coprocessor.

In some embodiments, a method is provided. The method includes determining a first power provided to integrated coprocessor including at least one central processing unit (CPU) core and at least one graphics processing unit (GPU) core. The integrated coprocessor is configured to generate commands for execution on a discrete coprocessor external to the integrated coprocessor. The method also includes determining a second power provided to the discrete coprocessor. The method further includes modifying at least one of the first power and the second power based on characteristics of workloads executing on the integrated coprocessor and the discrete coprocessor and based on a platform power limit that is shared by the integrated coprocessor and the discrete coprocessor.

In some embodiments, an apparatus is provided. The apparatus includes an integrated coprocessor including a central processing unit (CPU) and an integrated graphics processing unit (iGPU). The CPU is configured to generate commands for execution on the iGPU and a discrete coprocessor. The apparatus also includes power distribution circuitry configured to shift power dynamically between the integrated coprocessor and the discrete coprocessor based on a platform power limit that is shared by the integrated coprocessor and the discrete coprocessor and in response to changes in characteristics of workloads executing on the integrated coprocessor and the discrete coprocessor.

A computer readable storage medium includes any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device is not required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes could be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

What is claimed is:

1. An apparatus, comprising:
an integrated coprocessor comprising at least one central processing unit (CPU) core and at least one graphics processing unit (GPU) core, the integrated coprocessor being configured to generate commands for execution on a discrete coprocessor external to the integrated coprocessor; and
power distribution circuitry configured to selectively provide power to the integrated coprocessor and the discrete coprocessor based on:
characteristics of workloads executing on the integrated coprocessor and the discrete coprocessor and based on a reduced platform power limit that is lower than a platform power limit shared by the integrated coprocessor and the discrete coprocessor, wherein the power distribution circuitry is further configured to selectively provide power to one or more of the integrated coprocessor or the discrete coprocessor based on at least one of:
a power dissipation of at least one of a heat dissipation device coupled to the integrated coprocessor or a heat dissipation device coupled to the discrete coprocessor; or
a skin temperature determined for an exterior portion of the apparatus configured for contact by a user, wherein the skin temperature is determined based on at least one of:
temperature measurements taken by one or more sensors proximate to at least one of a casing or a display of the apparatus; or
activity metrics associated with one or more components of the apparatus, wherein the activity metrics indicate an amount of heat generated by the one or more components.

2. The apparatus of claim 1, wherein the power distribution circuitry is further configured to:
determine a first power provided to the integrated coprocessor and a second power provided to the discrete coprocessor, and
compare a sum of the first power and the second power to the reduced platform power limit.

3. The apparatus of claim 2, wherein the power distribution circuitry is further configured to increase the second power provided to the discrete coprocessor in response to the sum being less than the reduced platform power limit.

4. The apparatus of claim 3, further comprising:
at least one sensor configured to measure at least one temperature; and
wherein the power distribution circuitry is further configured to increase the second power provided to the discrete coprocessor by an amount that is determined based on a comparison of the at least one temperature to at least one thermal constraint.

5. The apparatus of claim 4, wherein the power distribution circuitry is further configured to:
determine the skin temperature based on the at least one temperature, and
increase the second power provided to the discrete coprocessor by an amount that is determined based on a comparison of the skin temperature to a maximum skin temperature determined by the at least one thermal constraint.

6. The apparatus of claim 5, wherein the power distribution circuitry is further configured to decrease the second power provided to the discrete coprocessor in response to the skin temperature exceeding the maximum skin temperature.

7. The apparatus of claim 1, wherein the power distribution circuitry is further configured to modify the power provided to the integrated coprocessor and the discrete coprocessor in response to changes in characteristics of the workloads executing on at least one of the integrated coprocessor and the discrete coprocessor.

8. The apparatus of claim 7, wherein the power distribution circuitry is further configured to one of:
shift power from the integrated coprocessor to the discrete coprocessor in response to a workload shifting from being core intensive to graphics intensive; or
shift power from the discrete coprocessor to the integrated coprocessor in response to a workload shifting from being graphics intensive to core intensive.

9. The apparatus of claim 1, wherein the reduced platform power limit is lower than a platform limit by an amount determined by one or more thermal constraints.

10. A method by an apparatus, the method comprising:
determining a first power provided to an integrated coprocessor comprising at least one central processing unit (CPU) core and at least one graphics processing unit (GPU) core, the integrated coprocessor being configured to generate commands for execution on a discrete coprocessor external to the integrated coprocessor;
determining a second power provided to the discrete coprocessor; and
modifying at least one of the first power or the second power based on characteristics of workloads executing on the integrated coprocessor and the discrete coprocessor, a reduced platform power limit that is lower than a platform limit shared by the integrated coprocessor and the discrete coprocessor, and at least one of:
a power dissipation of at least one of a heat dissipation device coupled to the integrated coprocessor or a heat dissipation device coupled to the discrete coprocessor; or
a skin temperature determined for an exterior portion of the apparatus configured for contact by a user, wherein the skin temperature is determined based on at least one of:
temperature measurements taken by one or more sensors proximate to at least one of a casing or a display of the apparatus; or
activity metrics associated with one or more components of the apparatus, wherein the activity metrics indicate an amount of heat generated by the one or more components.

11. The method of claim 10, further comprising:
comparing a sum of the first power and the second power to the reduced platform power limit.

12. The method of claim 11, further comprising:
increasing the second power provided to the discrete coprocessor in response to the sum being less than the reduced platform power limit.

13. The method of claim 12, further comprising:
measuring at least one temperature associated with at least one of the integrated coprocessor and the discrete coprocessor; and
increasing the second power provided to the discrete coprocessor by an amount that is determined based on a comparison of the at least one temperature to at least one thermal constraint.

14. The method of claim 13, further comprising:
determining the skin temperature based on the at least one temperature;
comparing the skin temperature to a maximum skin temperature determined by the at least one thermal constraints; and
increasing the second power provided to the discrete coprocessor by an amount that is determined based on the comparison.

15. The method of claim 14, further comprising:
decreasing the second power provided to the discrete coprocessor in response to the skin temperature exceeding the maximum skin temperature.

16. The method of claim 10, further comprising:
modifying the at least one of the first power or the second power in response to changes in characteristics of the workloads executing on at least one of the integrated coprocessor and the discrete coprocessor.

17. The method of claim 16, further comprising:
shifting power from the integrated coprocessor to the discrete coprocessor in response to the workload shifting from being core intensive to graphics intensive.

18. The method of claim 16, further comprising:
shifting power from the discrete coprocessor to the integrated coprocessor in response to the workload shifting from being graphics intensive to core intensive.

19. An apparatus comprising:
an integrated coprocessor comprising a central processing unit (CPU) and an integrated graphics processing unit (iGPU), wherein the CPU is configured to generate commands for execution on the iGPU and a discrete coprocessor; and
power distribution circuitry configured to shift power dynamically between the integrated coprocessor and the discrete coprocessor based on a platform power limit that is shared by the integrated coprocessor and the discrete coprocessor and in response to changes in characteristics of workloads executing on the integrated coprocessor and the discrete coprocessor, wherein the power distribution circuitry is further configured to shift power dynamically between the integrated coprocessor and the discrete coprocessor based on at least:
a power dissipation of at least one of a heat dissipation device coupled to the integrated coprocessor or a heat dissipation device coupled to the discrete coprocessor.

20. The apparatus of claim 19, further comprising:
at least one sensor configured to measure at least one temperature, and
wherein the power distribution circuitry is configured to modify power provided to at least one of the integrated coprocessor and the discrete coprocessor in response to changes in the at least one temperature, and
wherein the power distribution circuitry is configured to exchange workload activity demands and power limit information with the discrete coprocessor.

21. The apparatus of claim 19, wherein the power distribution circuitry is further configured to shift power dynamically between the integrated coprocessor and the discrete coprocessor based on at least one of:

temperature measurements taken by one or more sensors proximate to at least one of a casing or a display of the apparatus; or activity metrics associated with one or more components of the apparatus, wherein the activity metrics indicate an amount of heat generated by the one or more components.

\* \* \* \* \*